US008374134B2

(12) United States Patent
Wang et al.

(10) Patent No.: US 8,374,134 B2
(45) Date of Patent: Feb. 12, 2013

(54) LOCAL BROADCAST OF DATA USING AVAILABLE CHANNELS OF A SPECTRUM

(75) Inventors: Yu Albert Wang, Cerritos, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 12/547,834

(22) Filed: Aug. 26, 2009

(65) Prior Publication Data

US 2010/0195667 A1 Aug. 5, 2010

Related U.S. Application Data

(60) Provisional application No. 61/148,872, filed on Jan. 30, 2009, provisional application No. 61/222,845, filed on Jul. 2, 2009, provisional application No. 61/230,602, filed on Jul. 31, 2009.

(51) Int. Cl.
*H04Q 7/00* (2006.01)

(52) U.S. Cl. ........................................ 370/329; 370/466

(58) Field of Classification Search .................. 370/328, 370/329, 252, 466
See application file for complete search history.

(56) References Cited

U.S. PATENT DOCUMENTS 6,810,233 B2 10/2004 Parsiokas
7,401,350 B1 7/2008 Asada
2002/0102992 A1* 8/2002 Koorapaty et al. ........... 455/456
2002/0133545 A1* 9/2002 Fano et al. ..................... 709/203
2004/0203814 A1* 10/2004 Ho et al. ........................ 455/450
2004/0240415 A1* 12/2004 Lane ............................. 370/335
2005/0028207 A1* 2/2005 Finseth et al. .................. 725/46
2006/0039483 A1 2/2006 Lee et al.
2006/0084444 A1 4/2006 Kossi et al.
2006/0193286 A1* 8/2006 Naghian et al. ............... 370/328
2007/0256108 A1 11/2007 Du Val et al.
2008/0086286 A1 4/2008 Shellhammer
2008/0165754 A1 7/2008 Hu
2009/0193458 A1* 7/2009 Finseth et al. .................. 725/34
2009/0270025 A1* 10/2009 Kossi et al. .................. 455/3.01
2010/0025561 A1* 2/2010 Becker .......................... 248/634
2010/0048234 A1* 2/2010 Singh ............................ 455/509
2010/0062793 A1* 3/2010 Sun et al. ................... 455/456.3
2010/0081449 A1* 4/2010 Chaudhri et al. .......... 455/452.2
2010/0144357 A1* 6/2010 Chaudhri et al. ............. 455/450
2010/0325666 A1* 12/2010 Wiser et al. ..................... 725/44
2011/0069720 A1 3/2011 Jacobs et al.

FOREIGN PATENT DOCUMENTS

WO 2008086243 7/2008
WO WO2008155598 A1 12/2008

OTHER PUBLICATIONS

International Search Report & Written Opinion—PCT/US2010/023085, International Search Authority—European Patent Office—May 25, 2010.
Rajamani, et al., Control Link for Wireless Display Unit, U.S. Appl. No. 12/611,798, filed Nov. 3, 2009.
S.J. Shellhammer at al., "Technical Challenges for Cognitive Radio in the TV White Space Spectrum," Information Theory and Applications Workshop, 2009, Feb. 2009.
Y. Hur et al., "A Cognitive Radio (CR)-based Mobile Interactive Digital Broadcasting Application adopting a Multi-Resolution Spectrum-Sensing (MRSS) Technique," IEEE, 5 pages, 2007.

(Continued)

*Primary Examiner* — Andrew Lee
(74) *Attorney, Agent, or Firm* — Kevin T. Cheatham

(57) ABSTRACT

In general, this disclosure relates to techniques for transmitting data for applications using one or more available channels of a spectrum. One example method comprises transforming data into a digital broadcast format, identifying at least one available channel of a spectrum, and transmitting the transformed data in the at least one identified available channel.

47 Claims, 9 Drawing Sheets

OTHER PUBLICATIONS

Federal Communications Commission, "Second Report and Order and Memorandum Opinion and Order," Released Nov. 14, 2008, 130 pages, FOC 08-260, Washington, D.C., 20554.

International Preliminary Report on Patentability—PCT/US2010/042345, The International Bureau of WIPO—Geneva, Switzerland, Oct. 5, 2011.

* cited by examiner

LOCAL BROADCAST OF DATA USING AVAILABLE CHANNELS OF A SPECTRUM

This application claims the benefit of U.S. Provisional Application 61/148,872, filed on Feb. 3, 2009, U.S. Provisional Application 61/222,845, filed on Jul. 2, 2009, and U.S. Provisional Application 61/230,602, filed on Jul. 31, 2009, the entire content of each of which is incorporated herein by reference.

TECHNICAL FIELD

This disclosure relates to the transmission of data over a broadcast network.

BACKGROUND

Presently, several solutions for the wireless display of multimedia data, such as wireless HDMI (High-Definition Multimedia Interface), are in development. The primary intent for these solutions is to replace the HDMI cable between a particular component (e.g., set-top box, digital versatile disc (DVD) player, computing device) and a display device.

Certain providers have developed solutions that use proprietary methodologies for the transmission of uncompressed video. Other solutions may target consumer electronic devices (e.g., game consoles or DVD players) and require dedicated hardware on both the host and client side. The power consumption for such dedicated devices may be quite high. In addition, the transmission of uncompressed video in certain solutions may limit any expansion capabilities to support higher-resolution data transmission.

SUMMARY

In general, this disclosure relates to techniques for transmitting data for applications using one or more available channels of a spectrum. Certain techniques may facilitate the wireless transmission of data for various services/applications from one or more devices (e.g., mobile or handheld device) to an external device utilizing an identified, available channel of a spectrum. For example, a mobile device may transmit certain multimedia data to a display device using an available channel on a television band spectrum.

An example method comprises transforming data into a digital broadcast format, identifying at least one available channel of a spectrum, and transmitting the transformed data in the at least one identified available channel.

An example communication device comprises a transformation unit, a channel identifier, and a digital transmitter. The transformation unit is configured to transform data into a digital broadcast format. The channel identifier is configured to identify at least one available channel of a spectrum. The digital transmitter is configured to transmit the transformed data in the at least one identified available channel.

An example computer-readable storage medium is encoded with instructions for causing one or more processors to transform data into a digital broadcast format, identify at least one available channel of a spectrum, and transmit the transformed data in the at least one identified available channel.

The techniques described in this disclosure may be implemented in hardware, software, firmware, or any combination thereof. For example, various techniques may be implemented or executed by one or more processors. As used herein, a processor may refer to a microprocessor, an application specific integrated circuit (ASIC), a field programmable gate array (FPGA), a digital signal processor (DSP), or other equivalent integrated or discrete logic circuitry. Software may be executed by one or more processors. Software comprising instructions to execute the techniques may be initially stored in a computer-readable medium and loaded and executed by a processor.

Accordingly, this disclosure also contemplates computer-readable storage multimedia comprising instructions to cause a processor to perform any of a variety of techniques as described in this disclosure. In some cases, the computer-readable storage medium may form part of a computer program storage product, which may be sold to manufacturers and/or used in a device. The computer program product may include the computer-readable medium, and in some cases, may also include packaging materials.

The details of one or more aspects are set forth in the accompanying drawings and the description below. Other features, objects, and advantages will be apparent from the description and drawings, and from the claims.

DETAILED DESCRIPTION

Figure 1:
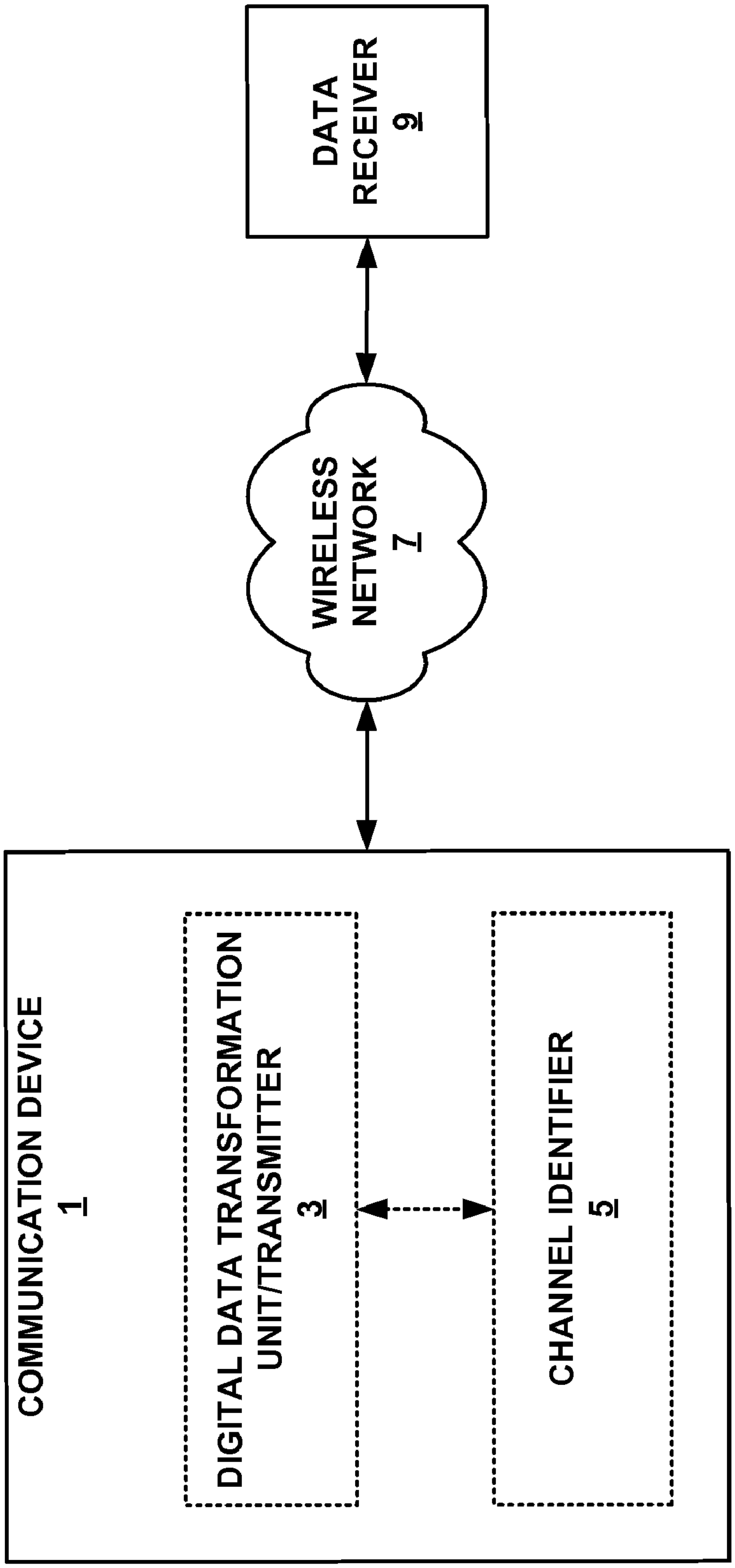
FIG. 1 is a block diagram illustrating an example of a communication device being communicatively coupled to a data receiver via a wireless network.

FIG. 1 is a block diagram illustrating an example of a communication device being communicatively coupled to a data receiver via a wireless network. Communication device 1 is capable of sending data (e.g., multimedia) to, and/or receiving data from, data receiver 9. In some cases, the data may comprise multimedia data including at least one of audio data, video data, text data, speech data, and graphics data. In the example of FIG. 1, although communication device 1 is shown as only sending data to one data receiver 9 via wireless network 7, communication device 1 may also, in some cases, be capable of sending or broadcasting data to one or more data receivers, including data receiver 9, via wireless network 7.

In some instances, wireless network 7 may comprise a network providing support for communications across a spectrum for a digital broadcast format, such as an Advanced Television Systems Committee (ATSC) format, a Digital Video Broadcasting (DVB) format, a Terrestrial Digital Multimedia Broadcasting (T-DMB) format, an Integrated Services Digital Broadcasting Terrestrial (ISDB-T) format, or a Moving Picture Experts Group Transport Stream (MPEG-TS) format (provided by International Standard ISO/IEC 13818-1), to name only a few, as will be described in more detail below. (DVB standards are a suite of internationally accepted, open standards for digital television, and are published by a Joint Technical Committee (JTC) of European Telecommunications Standards Institute (ETSI), European Committee for Electrotechnical Standardization (CENELEC), and European Broadcasting Union (EBU). DMB is a digital radio transmission technology for sending multimedia data to mobile devices.) A digital broadcast format may be a broadcast format in which no specific or particular destination is provided in or specified by the transmitted data. For example, a digital broadcast format may comprise a format in which the header of a broadcasted data packet or unit does not include any destination address.

Communication device 1 may comprise a fixed device, which transmits or receives data at a specified location, or a mobile device. Communication device 1 may comprise a stand-alone device or may be part of a larger system. For example, communication device 1 may comprise, or be part of, a wireless multimedia communication device (such as a wireless mobile handset), a digital camera, digital TV, a video camera, a video telephone, a digital multimedia player, a personal digital assistant (PDA), a video game console, a personal computer or laptop device, or other video device. Communication device 1 may also be included within one or more integrated circuits, or chips, which may be used in some or all of the devices described above.

As shown in FIG. 1, communication device 1 may include a digital data transformation unit/transmitter 3, which is coupled to a channel identifier 5. Though digital data transformation unit/transmitter 3 and channel identifier 5 are shown as included within communication device 1 in FIG. 1, one or both of these components 3, 5 may not necessarily need to be included within communication device 1 in all instances. For example, in some cases, these components 3, 5 could be included within a separate or peripheral device that is coupled to communication device 1. Thus, digital data transformation unit/transmitter 3 and channel identifier 5 may be part of one or more devices, one of which may be communication device 1. For purposes of illustration only in FIG. 1, it will be assumed, in this example, that these components 3, 5 are part of communication device 1.

Communication device 1 is capable of receiving, processing, and generating data. For example, communication device 1 may receive data over any of many possible radio or access networks, including cellular, local wireless, or broadcast format, including ATSC, DVB, or T-DMB. In some instances, communication device 1 may receive data over a wired interface or via one or more embedded interfaces. The data may also be generated in an uncompressed format via image/video sensors for camera or other camcorder applications. In some examples, the data may include one or more of audio data, video data, graphics data, text data, speech data, or metadata.

Communication device 1 is further capable of broadcasting data to one or more other devices, such as data receiver 9 through wireless network 7. Digital data transformation unit/transmitter 3 is capable of transforming data into a particular digital broadcast format. For example, digital data transformation unit/transmitter 3 may be capable of encoding data that complies with a particular digital broadcast format (e.g., ATSC, DVB, T-DMB), and modulating the encoded data.

Channel identifier 5 is able to identify at least one available channel of a spectrum, where device 1 may be involved in the identification of the at least one available channel. For example, the identification of the at least one available channel may initiated by communication device 1. In some instances, the channel identifier may identify the at least one available channel in an unused and/or unlicensed portion of a broadcast spectrum, such as a digital television broadcast spectrum. In some instances, the at least one available channel may comprise television band white space. As specified in the "Second Report and Order and Memorandum Opinion and Order" adopted by the Federal Communications Commission (FCC) on Nov. 4, 2008, and released on Nov. 14, 2008 as FCC Order 08-260, "white space" may comprise unused portions or locations of a broadcast television spectrum that are not currently being used by licensed services, and which therefore may be used by unlicensed radio transmitters.

In some instances, an available channel may comprise a channel that in currently unoccupied. In one example, an available channel may comprise a channel that is not currently being used by any authorized or licensed users (e.g., users licensed by the FCC). In one example, an available channel may comprise a channel that is not currently being used either by licensed users or by unlicensed users (e.g., other white space channel users). In some cases, an available channel may comprise a channel that may be used by a user upon acquiring a secondary license from another licensed user.

In certain situations, channel identifier 8 may identify multiple available channels that may be needed for data broadcast based upon any specific requirements or needs of applications or services that are executed on communication device 1. In one example, an available channel is one that is not currently being used by an authorized user at or near the same geographic location as communication device 1, and is acceptable for use by communication device 1.

Upon identification of the one or more available channels, transformation unit/transmitter 3 may transmit the transformed (e.g., encoded, modulated) data to data receiver 9 via wireless network 7, in the at least one identified available channel. In certain cases, communication device 1 will perform one or more of the above-described actions, either automatically or via user input, based upon the execution of one or more services, or applications, locally running on communication device 1. In some cases, data receiver 9 may include functionality for demodulating and/or decoding the received broadcast data from communication device 1. In some cases, transformation unit/transmitter 3 may broadcast the data, via wireless network 7, to multiple data receivers (including data receiver 9) in the at least one identified available channel.

As described above, channel identifier 5 is able to identify at least one available channel of a broadcast spectrum for the particular digital broadcast format. In one example, channel identifier 5 may include a spectrum sensor that is used to identify the at least one available channel by sensing signal information within one or more channel ranges, or bands, within the broadcast spectrum. In one example, channel identifier 5 may access a database (e.g., a digital TV bands database, such as the one shown in FIG. 5) to identify the at least one available channel.

Figure 2:
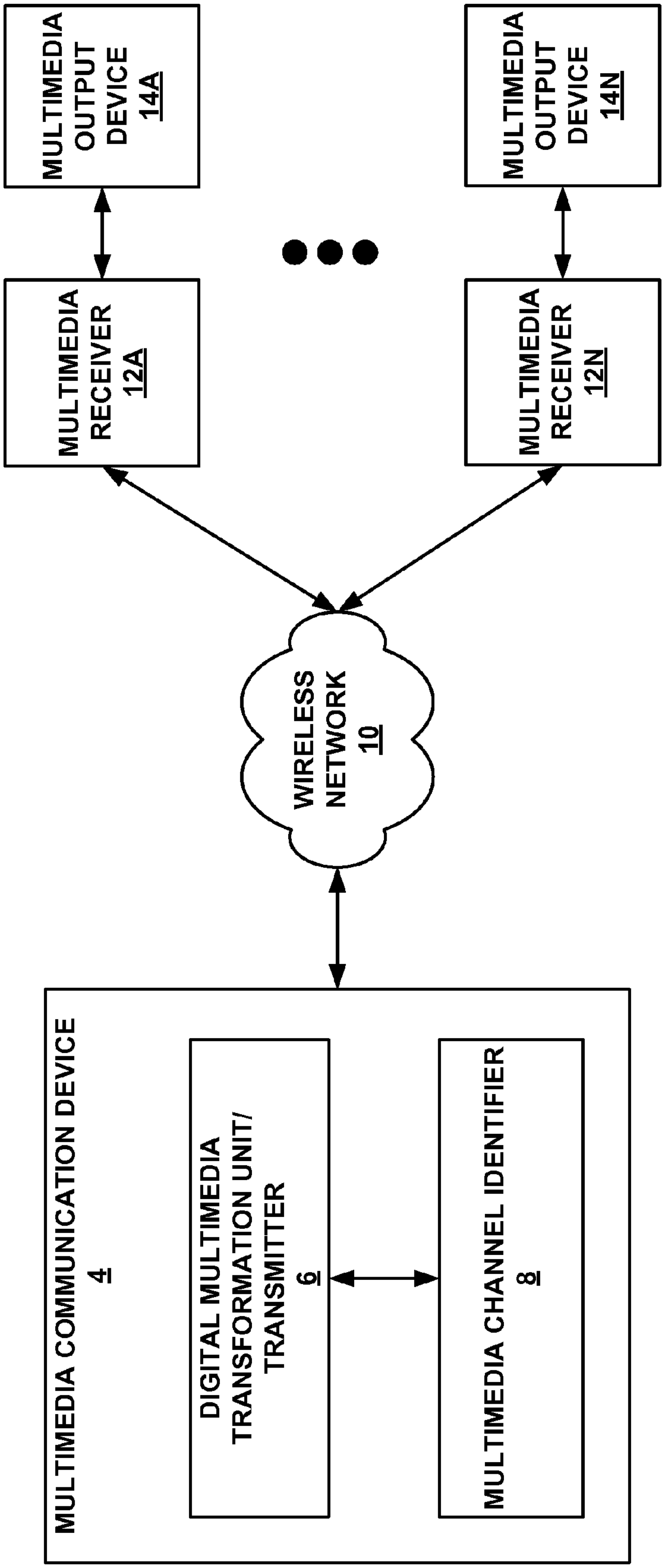
FIG. 2 is a block diagram illustrating an example of a multimedia communication device being communicatively coupled to one or more multimedia receivers and one or more multimedia output devices via a wireless network.

FIG. 2 is a block diagram illustrating an example of a multimedia communication device 4, which may include a channel identifier 8, being communicatively coupled to one or more communication receivers 12A-12N and one or more multimedia output devices 14A-14N via a wireless network 10. Multimedia communication device 4 is capable of sending data (e.g., multimedia) to, and/or receiving data from, the one or more receivers 12A-12N. In some cases, the data may comprise multimedia data including at least one of audio data, video data, text data, speech data, and graphics data.

In some instances, wireless network 10 may comprise a network providing support for communications across a broadcast spectrum for a digital broadcast format, such as an Advanced Television Systems Committee (ATSC), Digital Video Broadcasting (DVB), or Terrestrial Digital Multimedia Broadcasting (T-DMB) format, to name only a few, as will be described in more detail below. (DVB standards are a suite of internationally accepted, open standards for digital television, and are published by a Joint Technical Committee (JTC) of European Telecommunications Standards Institute (ETSI), European Committee for Electrotechnical Standardization (CENELEC), and European Broadcasting Union (EBU). DMB is a digital radio transmission technology for sending multimedia data to mobile devices.)

Multimedia communication device 4 may comprise a fixed device, which transmits or receives data at a specified location, or a mobile device. Multimedia communication device 4 may comprise a stand-alone device or may be part of a larger system. For example, multimedia communication device 4 may comprise, or be part of, a wireless multimedia communication device (such as a wireless mobile handset), a digital camera, digital TV, a video camera, a video telephone, a digital multimedia player, a personal digital assistant (PDA), a video game console, a personal computer or laptop device, or other video device. Multimedia communication device 4 may also be included within one or more integrated circuits, or chips, which may be used in some or all of the devices described above.

As shown in FIG. 2, multimedia communication device 4 may include a digital multimedia transformation unit/transmitter 6, which is coupled to a multimedia channel identifier 8. Though digital multimedia transformation unit/transmitter 6 and multimedia channel identifier 8 are shown as included within multimedia communication device 4 in FIG. 2, one or both of these components 6, 8 may not necessarily need to be included within multimedia communication device 4 in all instances. For example, in some cases, these components 6, 8 could be included within a separate or peripheral device that is coupled to multimedia communication device 4. Thus, digital multimedia transformation unit/transmitter 6 and multimedia channel identifier 8 may be part of one or more devices, one of which may be multimedia communication device 4. For purposes of illustration only in FIG. 2, it will be assumed, in this example, that these components 6, 8 are part of multimedia communication device 4.

Multimedia communication device 4 is capable of receiving, processing, and generating multimedia data. For example, communication device 4 may receive multimedia data over any of many possible radio or access networks, including cellular, local wireless, or broadcast format, including ATSC, DVB, or T-DMB. Multimedia data may also be generated in an uncompressed format via image/video sensors for camera or other camcorder applications. In some examples, multimedia data may include one or more of audio data, video data, graphics data, text data, speech data, or metadata.

Multimedia communication device 4 is further capable of broadcasting multimedia data to one or more other devices, such as multimedia output devices 14A-14N, through wireless network 10. Digital multimedia transformation unit/transmitter 6 is capable of transforming multimedia data into a particular digital broadcast format. For example, digital multimedia transformation unit/transmitter 6 may be capable of encoding multimedia data that complies with a particular digital broadcast format (e.g., ATSC, DVB, T-DMB), and modulating the encoded multimedia data.

Multimedia channel identifier 8 is able to identify at least one available channel of a spectrum, where the identification is initiated by multimedia communication device 4. In some cases, multimedia channel identifier 8 may identify multiple available channels that may be needed for multimedia broadcast based upon any specific requirements or needs of applications or services that are executed on multimedia communication device 4. In one example, an available channel is one that is not currently being used by an authorized user at or near the same geographic location as multimedia communication device 4, and is acceptable for use by multimedia communication device 4.

Upon identification of the one or more available channels, transformation unit/transmitter 6 may transmit the transformed (e.g., encoded, modulated) data to one or more of multimedia output devices 14A-14N, via wireless network 10, in the at least one identified available channel. In certain cases, multimedia communication device 4 will perform one or more of the above-described actions, either automatically or via user input, based upon the execution of one or more services, or applications, locally running on multimedia communication device 4.

For example, in one example, an application may determine to broadcast specified multimedia content solely to multimedia output device 14A via wireless network 10. Multimedia receiver 12A may receive the broadcast data, and may include a tuner that tunes multimedia receiver 12A to the appropriate channel through which data is being broadcast from multimedia communication device 4. Multimedia receiver 12A then provides the received data to multimedia output device 14A for processing (e.g., for display).

In another example, an application may determine to broadcast specified multimedia content to multiple ones of multimedia output devices 14A-14N in parallel (e.g., to transmit video data to multiple display devices at the same time). In this case, multimedia receivers 12A-12N may each receive the broadcast data, and may each include a tuner that tunes in to the appropriate channel (e.g., frequency or frequency band) through which data is being broadcast from multimedia communication device 4. Each multimedia receiver 12A-12N then provides the received data to its corresponding multimedia output device 14A-14N for processing.

In some cases, multimedia receivers 12A-12N may include functionality for demodulating and/or decoding the received broadcast data from multimedia communication device 4. In some cases, multimedia output devices 14A-14N may include such functionality. One or more of multimedia output devices 14A-14N may each comprise an external device with respect its corresponding multimedia receiver 12A-12N. In some instances, one or more of multimedia output devices 14A-14N may each be part of, or integrated within, its corresponding multimedia receiver 12A-12N.

As described above, multimedia channel identifier 8 is able to identify at least one available channel of a broadcast spectrum for the particular digital broadcast format. In one example, multimedia channel identifier 8 may include a spectrum sensor that is used to identify the at least one available channel by sensing signal information within one or more channel ranges, or bands, within the broadcast spectrum. In one example, multimedia channel identifier 8 may access a database (e.g., a digital TV bands database, such as the one shown in FIG. 5) to identify the at least one available channel.

For instance, multimedia communication device 4 may include geo-location functionality, whereby multimedia communication device 4 is capable of determining its geographic location (e.g., by using a Global Positioning System (GPS) or other similar component; pilot signal or other location techniques). In this instance, multimedia communication device 4 may provide such location information to a digital TV bands database. The digital TV bands database may be populated with channel information based upon location, and may be able to provide multimedia communication device 4 with a list of any available channels within the geographic region currently occupied by multimedia communication device 4.

The broadcast of multimedia data from multimedia communication device 4 to one or more of multimedia output devices 14A-14N may provide certain advantages. For example, local broadcasts from multimedia communication device 4 to multimedia output devices 14A-14N (e.g., when such devices are located in proximity, such as in one house or building) can be created similar to a distributed transmitter network but with potentially fewer issues. Since the broadcast may be limited to short range, even with potential line-of-sight type propagation, synchronization issues may be avoided.

Also, if multimedia communication device 4 is a mobile device, and multimedia output devices 14A-14N comprise one or more television devices, communication device 4 is conveniently able to extend mobile multimedia content to one or more television devices, with no need to physically couple communication device 4 to output devices 14A-14N, such as by using HDMI, VGA or other audio-visual cables. In addition, communication device 4 is capable of broadcasting digital TV content to multiple television devices at the same time (e.g., within one household having multiple TV sets).

Thus, in one scenario, a user may utilize multimedia communication device 4 to broadcast multimedia data to other collocated or non-collated multimedia output devices 14A-14N. For instance, a user may set up a wireless network in the user's home to couple multimedia communication device 4 to other devices. Multimedia communication device 4 may comprise, in one example, a personal or laptop computer. The user may wish to transmit multimedia data (e.g., a personal presentation, a television show or movie, web content, streaming video, digital photographs), as processed by multimedia communication device 4, to one or more televisions (e.g., in one or more rooms of the home). Multimedia communication device 4 may identify one or more available channels to broadcast such multimedia data to these one or more televisions, providing a convenient way to extend content from a computer to a television (e.g., large screen and/or high-definition television) without the need for using any wires or other physical connections.

Figure 3:
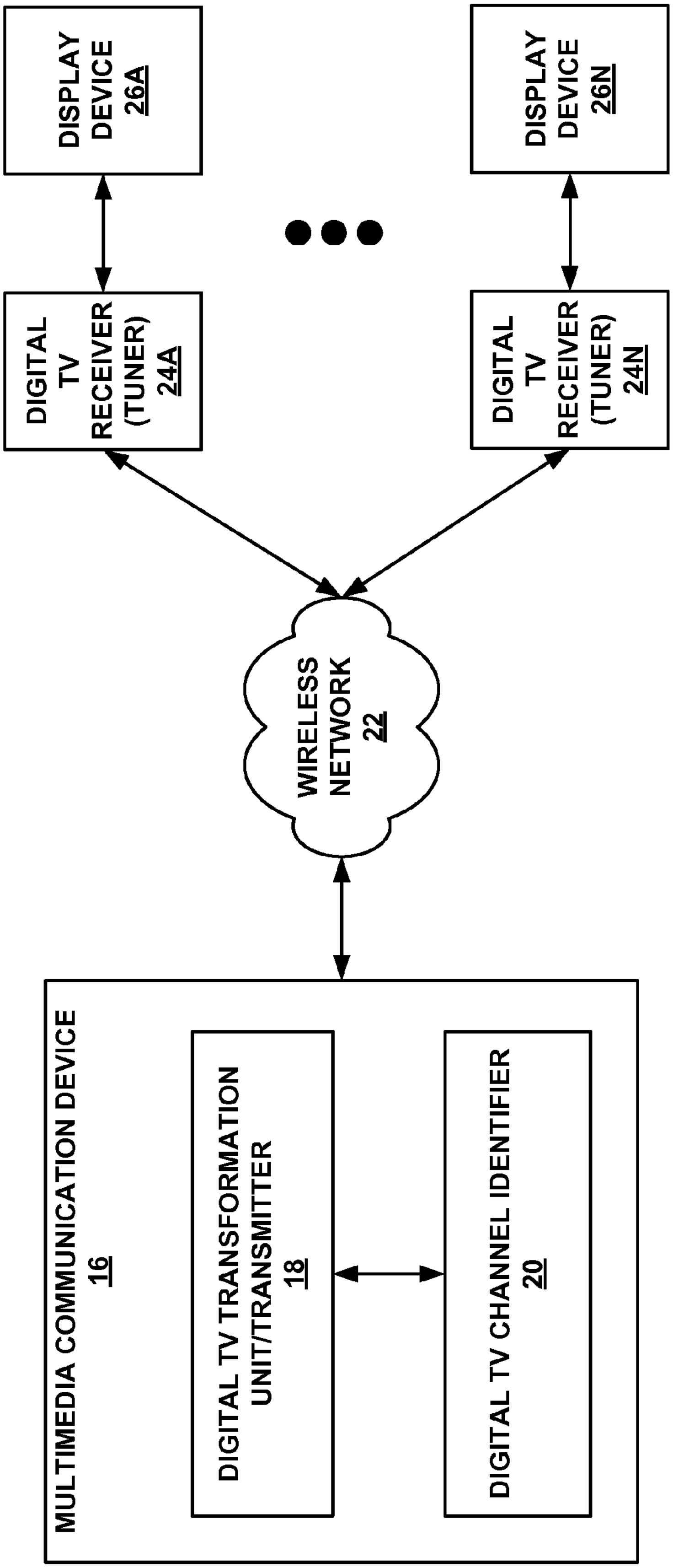
FIG. 3 is a block diagram illustrating an example of a multimedia communication device being communicatively coupled to one or more digital TV receivers and one or more display devices via a wireless network.

FIG. 3 is a block diagram illustrating an example of a multimedia communication device 16, which may include a digital TV channel identifier 20, being communicatively coupled to one or more digital TV receivers 24A-24N and one or more display devices 26A-26N via a wireless network 22. In FIG. 3, digital TV channel identifier 20 of multimedia communication device 16 is one example of a multimedia channel identifier, such as multimedia channel identifier 8 of multimedia communication device 4 shown in FIG. 2. Display devices 26A-26N are examples of multimedia output devices, such as multimedia output devices 14A-14N shown in FIG. 2.

As shown in FIG. 3, multimedia communication device 16 includes a digital TV transformation unit/transmitter 18, which is coupled to digital TV channel identifier 20. Though digital TV transformation unit/transmitter 18 and digital TV channel identifier 20 are shown as included within multimedia communication device 16 in FIG. 3, one or both of these components 18, 20 may not necessarily need to be included within multimedia communication device 16 in all instances. For example, in some cases, these components 18, 20 could be included within a separate or peripheral device that is coupled to multimedia communication device 16. Thus, digital TV transformation unit/transmitter 18 and digital TV channel identifier 20 may be part of one or more devices, one of which may be multimedia communication device 16. For purposes of illustration only in FIG. 3, it will be assumed, in this example, that these components 18, 20 are part of multimedia communication device 16.

Multimedia communication device 16 is capable of receiving, processing, and generating multimedia data. Multimedia communication device 16 is further capable of broadcasting multimedia data to one or more other devices, such as display devices 26A-26N, through wireless network 22. Digital TV transformation unit/transmitter 6 is capable of transforming multimedia data into a digital broadcast format (e.g., encoding multimedia data that complies with a particular digital broadcast TV format (e.g., ATSC), and modulating the encoded multimedia data).

Digital TV channel identifier 20 is able to identify at least one available TV channel in an unused portion of a broadcast TV spectrum for the particular digital broadcast TV format, where such identification is initiated by multimedia communication device 16. In some cases, digital TV channel identifier 20 may identify multiple available channels that may be needed for multimedia broadcast based upon any specific requirements or needs of applications or services that are executed on multimedia communication device 16.

Upon identification of the one or more available channels, transformation unit/transmitter 18 may transmit the transformed data (e.g., encoded, modulated multimedia data) to one or more of display devices 26A-26N, via wireless network 22, using the at least one identified available channel. In some cases, multimedia communication device 16 will initiate one or more of the above-described operations, either automatically or via user input, based upon the execution of one or more services, or applications, locally running on multimedia communication device 16.

Figure 4:
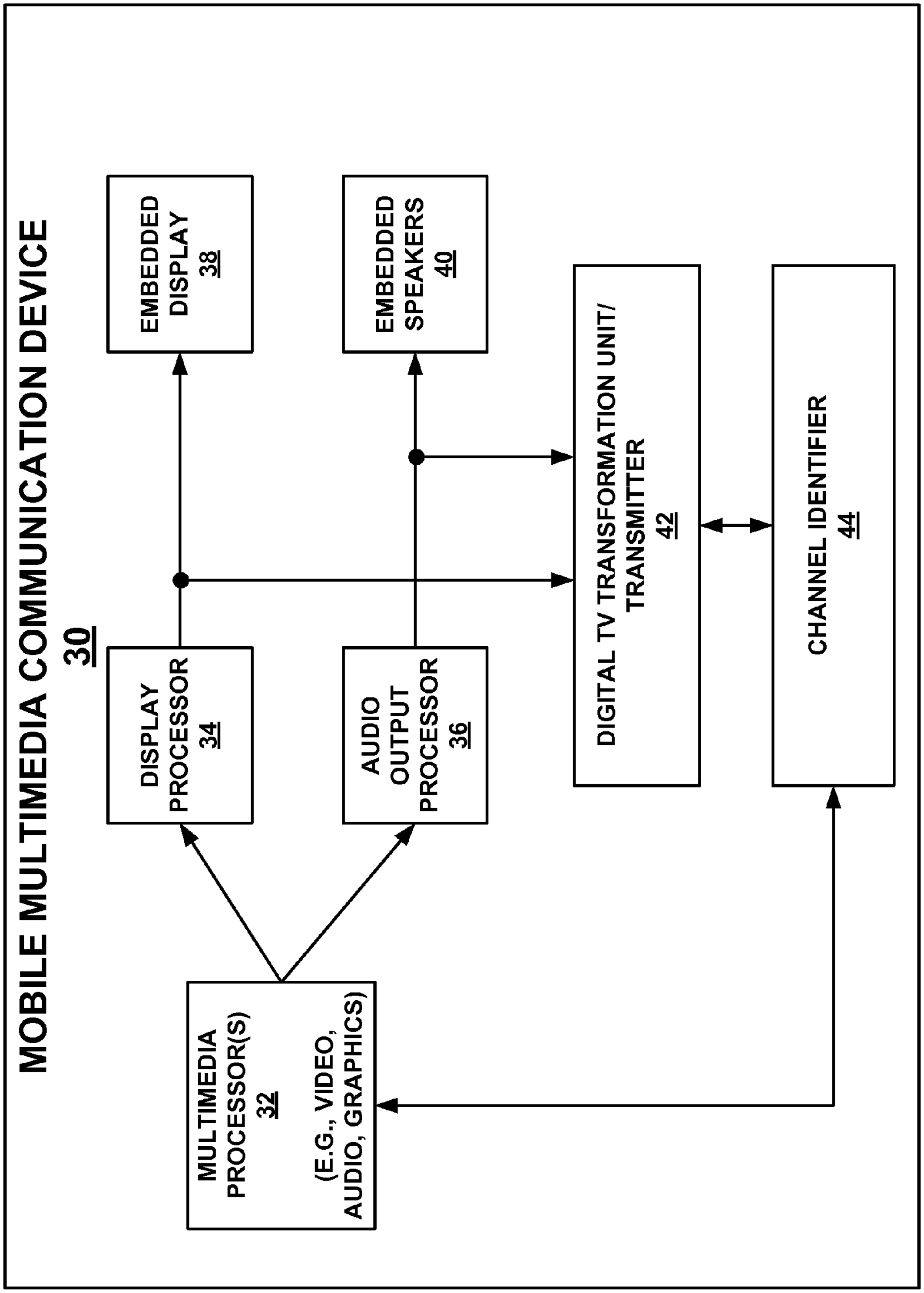
FIG. 4 is a block diagram illustrating an example of a mobile multimedia communication device that may be used as the multimedia communication device shown in FIG. 2 and/or FIG. 3.

FIG. 4 is a block diagram illustrating an example of a mobile multimedia communication device 30 that may be used as the multimedia communication device 4 shown in FIG. 2 and/or the multimedia communication device 16 shown in FIG. 3. Mobile multimedia communication device 30 comprises a mobile device, such as a wireless communication device or handset.

As shown in the example of FIG. 4, mobile multimedia communication device 30 includes various components. For example, in this particular example, mobile multimedia communication device 30 includes one or more multimedia processors 32, a display processor 34, an audio output processor 36, an embedded display 38, embedded speakers 40, a digital TV transformation unit/transmitter 42, and a channel identifier 44. Multimedia processors 32 may include one or more video processors, one or more audio processors, and one or more graphics processors. Each of the processors included within multimedia processors 32 may include one or more decoders.

Multimedia processors 32 are coupled to both display processor 34 and audio output processor 36. Video and/or graphics processors included within multimedia processors 32 may generate image and/or graphics multimedia data that is provided to display processor 34 for further processing and display on embedded display 38. For example, display processor 34 may perform one or more operations on the image and/or graphics data, such as scaling, rotation, color conversion, cropping, or other rendering operations. Any audio processors included within multimedia processors 32 may generate audio multimedia data that is provided to audio output processor 36 for further processing and output to embedded speakers 40. A user of mobile multimedia communication device 30 is thus able to view and hear representations of the multimedia data via embedded display 38 and embedded speakers 40.

In addition to providing output multimedia data to embedded display 38, display processor 34 may also provide its output to digital TV transformation unit/transmitter 42. Further, audio output processor 36 may provide its output to digital TV transformation unit/transmitter 42. As a result, digital TV transformation unit/transmitter 42 is capable of processing multiple streams of multimedia data. In some instances, display processor 34 and/or audio output processor 36 may store corresponding output multimedia data in one or more buffers, which are then accessed by digital TV transformation unit/transmitter 42 to retrieve the data. Digital TV transformation unit/transmitter 42 may include various components, as described in more detail below with reference to FIG. 5, for transforming multimedia data into a particular digital broadcast form (e.g., encoding, modulating the data), and transmitting the transformed data to another device via a wireless network in one or more identified available channels.

In some cases, digital TV transformation unit/transmitter 42 may transform and/or encapsulate multiple received streams of multimedia data from display processor 34 and audio output processor 36 into individual single program transport streams that may be transmitted over multiple broadcast channels. In some cases, the multiple streams of multimedia data may be encapsulated in the same transport stream and transmitted in a single channel. One multimedia stream may be transmitted as a picture-in-picture (PIP) data path that includes supplemental multimedia information or metadata with respect to the multimedia data. Metadata may include, for example, one or more of text, notification messages, program guide information, or menu information. In certain cases, digital TV transformation unit/transmitter 42 may receive data directly from multimedia processors 32. In these cases, digital TV transformation unit/transmitter 42 may transform and/or encapsulate the data received directly from multimedia processors into transport streams that may be transmitted.

In order for mobile multimedia communication device 30 to be able to broadcast or otherwise transmit multimedia data in one or more streams to a remote device via a wireless network, mobile multimedia communication device 30 identifies one or more available channels in an unused portion of a spectrum upon initiation by mobile multimedia communication device 30. Channel identifier 44 is capable of identifying these one or more available channels.

As will be described in further detail below with reference to the channel identification process, channel identifier 44 may identify available channels in one or more ways. For example, channel identifier 44 may utilize a spectrum sensor, such as the spectrum sensor shown in FIG. 5 or FIG. 6, which is able to dynamically sense available channels in one or more frequency bands. The spectrum sensor may be able to assign certain quality values with respect to the sensed signals (e.g., interference levels, signal-to-noise ratios) in order to determine the quality of any available channels within the spectrum for data transmission. The sensing algorithm may be carried out periodically and may be based on the format of a particular video stream being processed.

Channel identifier 44 may also utilize, either in conjunction with spectrum sensing or independently, geo-location functionality. Geo-location refers to the capability of mobile multimedia communication device 30 to determine its geographic coordinates through the use of a geo-location sensor (such as the one shown in FIG. 5), which may comprise, in one example, a GPS sensor. Channel identifier 44 may query an external digital channel database (e.g., a digital TV bands database, such as the one shown in FIG. 5) to obtain a list of available channels via wireless communication. Typically, such an external database may be maintained by one or more external devices or sources, but may be updated based upon requests and data flow from various devices, such as mobile multimedia communication device 30.

In one example, channel identifier 44 may send geo-location coordinates regarding the location of mobile multimedia communication device 30 to the external digital channel database, such as via a network (e.g., wireless network) connection. Channel identifier 44 may then receive, from the external database, a list of available channels for a geographic region associated with the location of mobile multimedia communication device 30, as indicated by the geo-location coordinates. Channel identifier 44 may then select one or more of the identified channels for use, and send data back to the external database regarding the intended use of these frequency channels by mobile multimedia communication device 30. The external database may therefore be updated accordingly based upon the received data from mobile multimedia communication device 30.

In some cases, the external database, once updated, may indicate that the selected channels are in use by mobile multimedia communication device 30 until mobile multimedia communication device 30 sends a subsequent message to the external database indicating that the channels are no longer needed or being used. In other cases, the external database may reserve the selected channels for device 30 only for a defined period of time. In these cases, device 30 may need to send a message to the external database within the defined period of time indicating that device 30 is still using the selected channels, in which case the external database will renew the reservation of the selected channels for a second period of time for use by device 30.)

In some instances, channel identifier 44 may select one or more of the available channels for use based upon the bandwidth demands or needs of any services or applications that are executing on mobile multimedia communication device 30, as indicated by, for example, by one or more of multimedia processors 32 during execution. For example, a particular multimedia application may require multiple broadcast streams each having high bandwidth demands. In this situation, channel identifier 44 may allocate multiple different available channels for transmission to accommodate the bandwidth requirements for these multiple broadcast streams.

Figure 9:
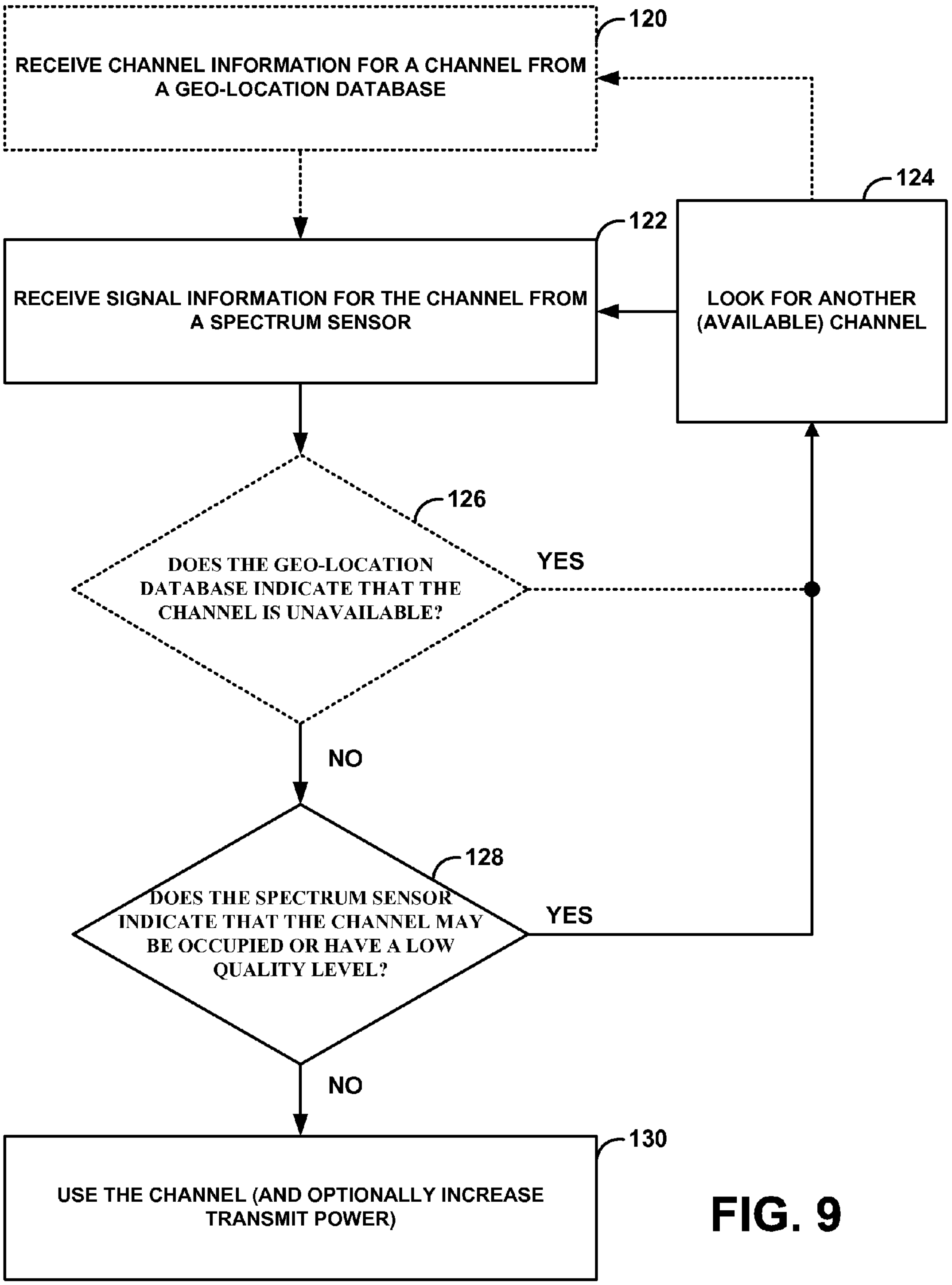
FIG. 9 is a flow diagram illustrating an example of a method that may be performed by a multimedia communication device, such as one or more of the multimedia communication devices shown in FIGS. 1-4, to identify an available channel using a spectrum sensor and optionally information received from a digital TV bands (geo-location) database.

In certain instances, channel identifier 44 may identify one or more available channels based upon information received from multiple sources. For example, if channel identifier 44 utilizes both a spectrum sensor and geo-location functionality, channel identifier 44 may need to process channel information from both of these sources when determining which channels may be available for use. In some cases, channel identifier 44 may need to manage conflicting channel information that may be provided by these multiple sources when selecting one or more channels. FIG. 9, explained in more detail below, provides an example of how a device, such as mobile multimedia communication device 30, may process channel information from multiple sources in some instances.

Upon identification of one or more available transmission channels by channel identifier 44, digital TV transformation unit/transmitter 42 may then broadcast or otherwise transmit the multimedia content or data to an external device via a network using the identified transmission channel(s). Mobile multimedia communication device 30 may initiate the broadcast transmission directly with such an external device.

Figure 5:
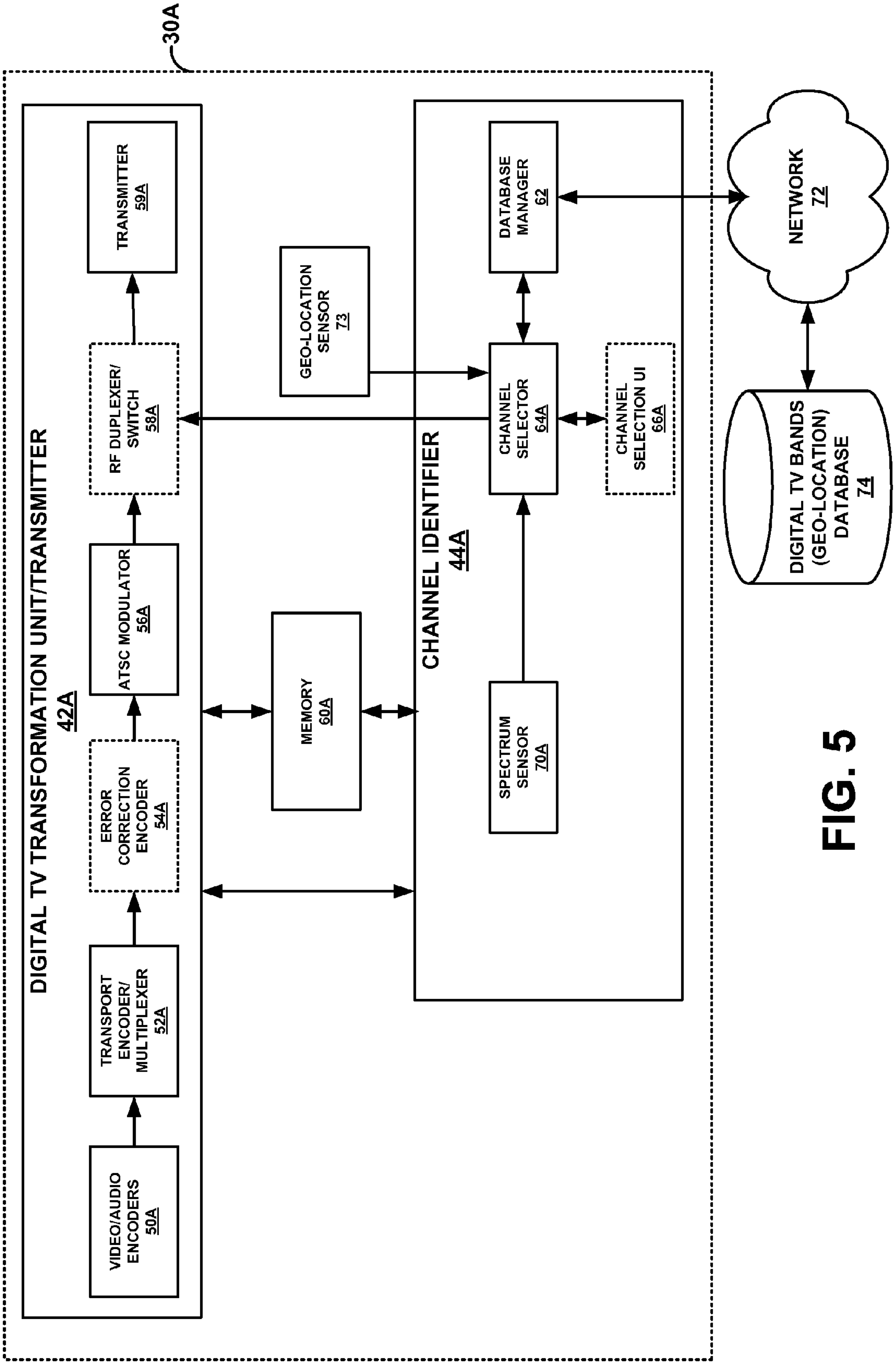
FIG. 5 is a block diagram illustrating an example of a digital TV processor and modulator/transmitter, in conjunction with a channel identifier, which may be implemented within a mobile multimedia communication device, such as the mobile multimedia communication device shown in FIG. 4.

FIG. 5 is a block diagram illustrating an example of a digital TV transformation unit/transmitter 42A, in conjunction with a channel identifier 44A, which may be implemented within a mobile multimedia communication device 30A. In FIG. 5, digital TV transformation unit/transmitter 42A may be one example of digital TV transformation unit/transmitter 42 shown in FIG. 4, while channel identifier 44A may be one example of channel identifier 44 shown in FIG. 4. In the example of FIG. 5, mobile multimedia communication device 30A is capable of broadcasting multimedia data according to a specific digital broadcast format, ATSC. Mobile multimedia communication device 30A may facilitate low-power transmission to an ATSC-ready external device, such as a high-definition or flat-panel television. In this case, the ATSC-ready device may comprise one of the multimedia output devices 14A-14N shown in FIG. 2.

As shown in FIG. 5, digital TV transformation unit/transmitter 42A may include various components, such as video and/or audio encoders 50A, transport encoder/multiplexer 52A, error correction encoder 54A, ATSC modulator 56A, radio frequency (RF) duplexer/switch 58A, and transmitter 59A. These components help support data transmission over a transmission spectrum using the ATSC standard. The ATSC standard is a multi-layered standard that provides layers for video encoding, audio encoding, transport streams, and modulation. In one example, RF duplexer/switch 58A may comprise an ultrahigh frequency (UHF) duplexer/switch. A duplexer may allow for signals to be received for sensing purses and to be transmitted for communication purposes.

Video/audio encoders 50A may include one or more video encoders and one or more audio encoders to encode video and/or audio data into one or more streams. For example, video/audio encoders 50A may include a Moving Picture Experts Group-2 (MPEG-2) encoder or a H.264 encoder (from the Telecommunication Standardization Sector, ITU-T) to encode video data. Video/audio encoders 50A may also include a Dolby Digital (Dolby AC-3) encoder to encoder audio data. An ATSC stream may contain one or more video programs and one or more audio programs. Any used video encoders may implement a main profile for standard definition video or a high profile for high-definition resolution video.

Transport (e.g., MPEG-2 Transport Stream, or TS) encoder/multiplexer 52A receives the encoded data streams from video/audio encoders 50A and is capable of assembling these data streams for broadcast, such as into one or more packetized elementary streams (PESs). These PESs may then be packetized into individual program transport streams. Transport encoder/multiplexer 52A may, in some instances, provide the output transport streams to an error correction encoder 54A (e.g., a Reed-Solomon encoder), which may perform error correction encoding functionality.

ATSC modulator 56A is capable of modulating the transport streams for broadcast. In some cases, ATSC modulator 56A may utilize 8 vestigial side band (8VSB) modulation for broadcast transmission. RF duplexer/switch 58A may then duplex the transport streams, or act as a switch for the transport streams. Transmitter 59A is capable of broadcasting one or more transport streams to one or more external devices using one or more available channels that are identified by channel identifier 44A.

Channel identifier 44A includes a database manager 62, a channel selector 64A, an optional channel selection user interface (UT) 66A, and a spectrum sensor 70A. Both channel identifier 44A and digital TV transformation unit/transmitter 42A are coupled to a memory 60A, which may comprise one or more buffers. Channel identifier 44A and digital TV transformation unit/transmitter 42A may exchange information directly, or may also exchange information indirectly through the storage and retrieval of information via memory 60A.

Channel identifier 44A includes a spectrum sensor 70A. As discussed previously, a spectrum sensor, such as spectrum sensor 70A, is capable of sensing signals in one or more frequency bands within a broadcast spectrum for a particular digital TV format, such as ATSC. Spectrum sensor 70A may determine channel availability and signal strengths based upon its ability to identify any broadcast data that occupies one or more used channels within the spectrum. Spectrum sensor 70A may then provide information to channel selector 64A as to the channels that are currently unused, or available. For example, spectrum sensor 70A may detect that a particular channel is available if it does not detect any data being broadcast on this channel by any external, separate devices. multimedia As shown in FIG. 5, channel selector 64A may also receive information from digital TV bands (geo-location) database via network 72 and database manager 62. Digital TV bands database 74 is located external to mobile multimedia communication device 30A and includes information regarding channels that are currently in use or available within the broadcast spectrum for a particular digital TV format, such as within an ATSC spectrum. Typically, the digital TV bands database 74 is updated dynamically as channels are put into use or freed for use by other devices. In some instances, digital TV bands database 74 may be organized by geographic location/region or by frequency bands (e.g., low VHF, high VHF, UHF).

In order for channel identifier 44A to obtain channel availability information from digital TV bands database 74, channel identifier 44A may, in some cases, provide geo-location information as input into digital TV bands database 74. Channel identifier 44A may obtain geo-location information or coordinates from geo-location sensor 73, which may indicate the geographic location of mobile multimedia communication device 30A at a particular point in time. Geo-location sensor 73 may, in some instances, comprise a GPS sensor.

Upon receipt of geo-location information from geo-location sensor 73, channel selector 64A may provide such information, as input, to digital TV bands database 74 via database manager 62. Database manager 62 may provide an interface to digital TV bands database 74. In some cases, database manager 62 may store a local copy of selected contents of digital TV bands database 74 as they are retrieved. In addition, database manager 62 may store select information provided by channel selector 64A to digital TV bands database 74, such as geo-location information.

Upon sending geo-location information pertinent to mobile multimedia communication device 30A, channel selector 64A may receive from digital TV bands database 74 a set of one or more available channels as presented listed within digital TV bands database 74. The set of available channels may be those channels that are available in the geographic region or location presently occupied by mobile multimedia communication device 30A, as indicated by geo-location sensor 73.

Upon receipt of available channel information from either or both of spectrum sensor 70A and digital TV bands database 74, channel selector 64A may select one or more available channels, either automatically or via user input via channel selection UT 66A. Channel selection UT may present available channels within a graphical user interface, and a user of a service or application may select one or more of these available channels.

In some instances, channel selector 64A may automatically select or identify one or more of the available channels that are to be used for broadcast transmission by mobile multimedia communication device 30A. For example, channel selector 64A may utilize information provided by one or more of multimedia processor 32 (FIG. 4) to determine which one or more of available channels to identify for broadcast transmission. In some cases, channel selector 64A may select multiple channels based upon the demands or needs of the services or applications that are executing. One or more transport streams associated with these services or applications may be broadcast across one or more of the identified channels by transmitter 59A.

Figure 6:
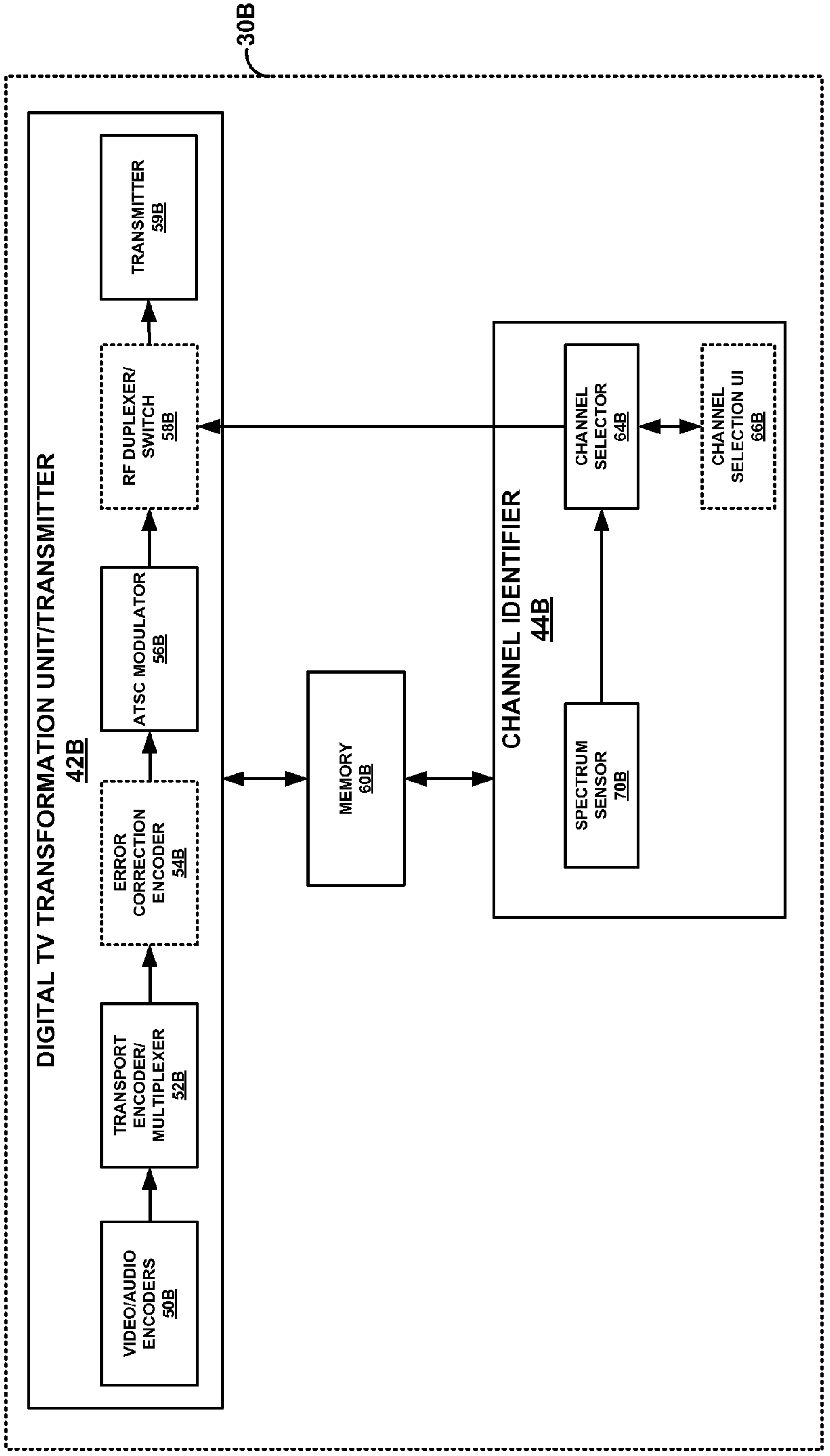
FIG. 6 is a block diagram illustrating another example of a digital TV processor and modulator/transmitter, in conjunction with a channel identifier, which may be implemented within a mobile multimedia communication device, such as the mobile multimedia communication device shown in FIG. 4.

FIG. 6 is a block diagram illustrating another example of a digital TV transformation unit/transmitter 42B, in conjunction with a channel identifier 44B, which may be implemented within a mobile multimedia communication device 30B. In FIG. 6, digital TV transformation unit/transmitter 42B may be one example of digital TV transformation unit/transmitter 42 shown in FIG. 4, while channel identifier 44B may be one example of channel identifier 44 shown in FIG. 4. Digital TV transformation unit/transmitter 42B and channel identifier 44B may each store and retrieve information from memory device 60B. Similar to digital TV transformation unit/transmitter 42A, digital TV transformation unit/transmitter 42B includes one or more video/audio encoders 50B, a transport encoder/multiplexer 52B, an error correction encoder 54B, an ATSC modulator 56B, an RF duplexer/switch 58B, and transmitter 59B.

Channel identifier 44B of FIG. 6 differs from channel identifier 44A of FIG. 5 in that channel identifier 44B does not include a database manager interfacing to a digital TV bands database. In FIG. 6, channel identifier 44B includes only a spectrum sensor 70B. Because no geo-location functionality is implemented in the example of FIG. 6, mobile multimedia communication device 30B does not include a geo-location sensor. Channel selector 64B identified one or more available channels for broadcast transmissions based upon the input received from spectrum sensor 70B. Channel selector 64B may also receive a user selection of a channel from a list of available channels via channel selection UT 66B. The list of available channels may be presented on the channel selection UT 66B based upon the sensed signal information provided by spectrum sensor 70B.

Figure 7:
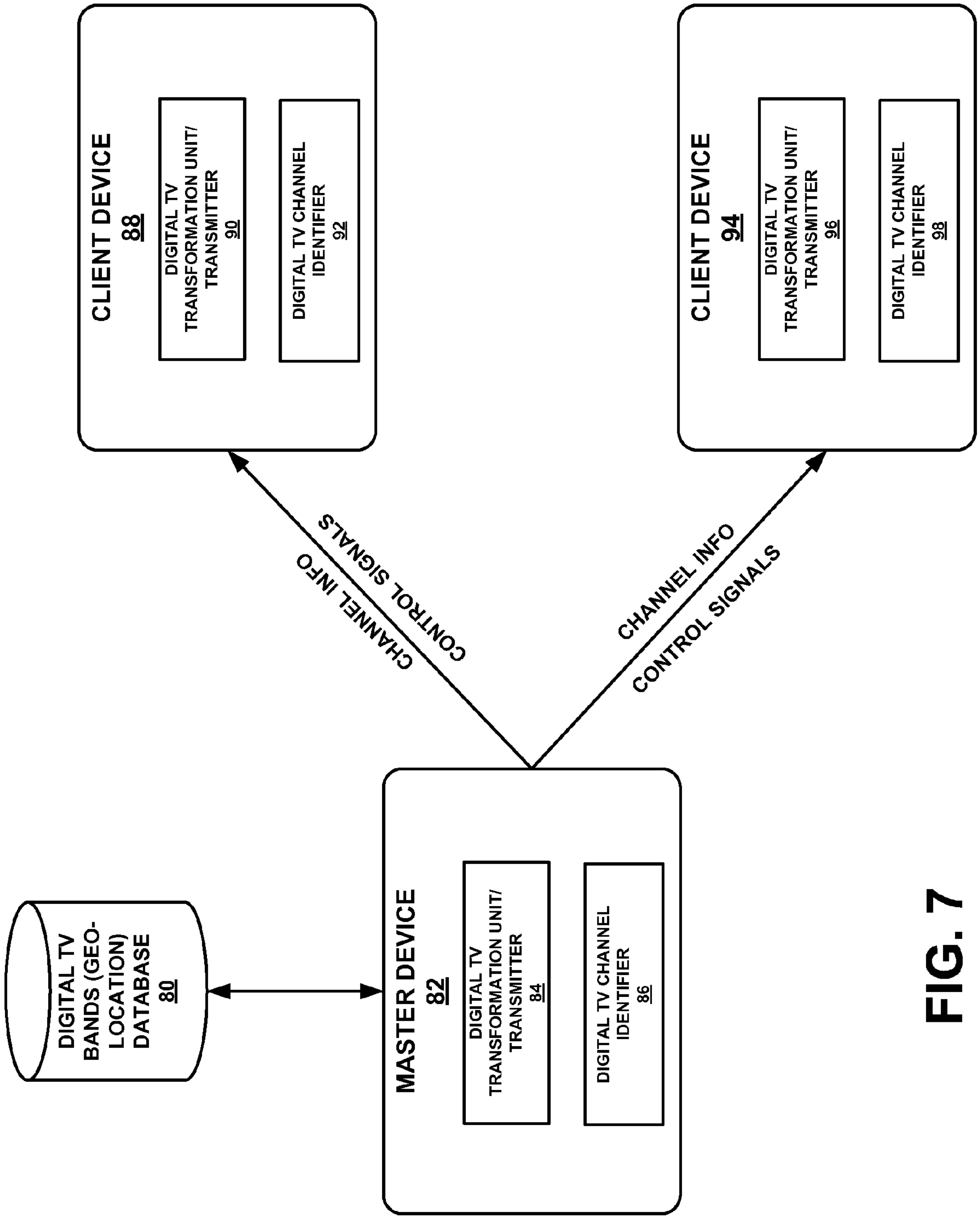
FIG. 7 is a block diagram illustrating an example of multiple multimedia communication devices, where one multimedia communication device serves as a master device that is coupled to a digital TV bands (geo-location) database, and where the remaining multimedia communication devices serve as client devices.

FIG. 7 is a block diagram illustrating an example of multiple multimedia communication devices, where one multimedia communication device serves as a master device 82 that is coupled to a digital TV bands (geo-location) database 80, and where the remaining multimedia communication devices serve as client devices (e.g., client devices 88 and 94). Master device 82, client device 88, and client device 94 may each comprise, in certain cases, a multimedia communication device, such as multimedia communication device 4 (FIG. 2), which is capable of broadcasting multimedia data in one or more broadcast streams to remote multimedia output devices. However, as is explained below, master device 82 may control the ability of client devices 88 and 94 to perform such broadcast transmissions.

In the example of FIG. 7, client device 88 and client device 94 may each operate in a client mode, in which the transmissions of client devices 88 and 94, along with frequency channels of operation, may be under the control of master device 82. Typically, client devices 88 and 94 do not initiate a network to begin broadcast transmissions until they receive enabling, or control, signals from master device 82.

Master device 82 may operate in a master mode, in which master device 82 has the capability to transmit without receiving an enabling signal. Master device 82 is able to select a channel itself and initiate a network by sending enabling signals, or control signals, to client devices 88 and 94.

As shown in FIG. 7, master device 82 is coupled to a digital TV bands (geo-location) database 80. Master device 82 may be able to use its digital TV channel identifier 86 to identify one or more available channels for broadcast transmission of multimedia data. Digital TV transformation unit/transmitter 84 is capable of transforming multimedia data into a digital broadcast format (e.g., encoding multimedia data, modulating such data), and transmitting the data in one or more data streams to one or more multimedia output devices. Master device 82 may include a geo-location sensor, and digital TV channel identifier 86 may identify the available channels based upon channel information provided by digital TV bands database 80. In some instances, digital TV channel identifier 86 may also utilize signal information from a spectrum sensor when identifying available channels. (In an alternate example, when multiple master devices are used, one master device may perform geo-location functions while another master device performs spectrum sensing functions.)

Client device 88 includes a digital TV transformation unit/transmitter 90, as well as a digital TV channel identifier 92. Likewise, client device 94 includes a digital TV transformation unit/transmitter 96 and digital TV channel identifier 98. Client devices 88 and 94 are not coupled to digital TV bands database 80 in the example of FIG. 7, and may not include geo-location sensors. Client devices 88 and 94 may include spectrum sensors for sensing available broadcast channels. However, prior to initiating any broadcast transmissions to one or more multimedia output devices, client devices 88 and 94 may first need to obtain enabling or control signals from master device 82.

In addition, in some cases, master device 82 may provide client devices 88 and 94 with a list of identified available channels, as determined by digital TV channel identifier 86, that client devices 88 and 94 may use. Client devices 88 and 94 may be configured to use the channels that are identified by master device 82 when initiating broadcast transmissions. In these cases, master device 82 and client devices 88 and 94 may be located in relatively close, or similar, geo-location regions.

If client devices 88 and/or 94 include their own spectrum sensing functions, these devices may utilize channel information provided by master 82, in possible conjunction with the signal information provided by their own spectrum sensors, when identifying available channels for broadcast multimedia transmission. In some examples, master device 82 and client devices 88 and/or 94 may perform negotiation operations in order to determine which available channels to select when broadcasting data from client devices 88 and/or 94.

For example, client devices 88 and/or 94 may execute services or applications that have certain bandwidth requirements or needs, and may negotiate with master device 82 to determine which available channels may be most appropriate to use when broadcasting data from client devices 88 and/or 94 for these services or applications.

Figure 8:
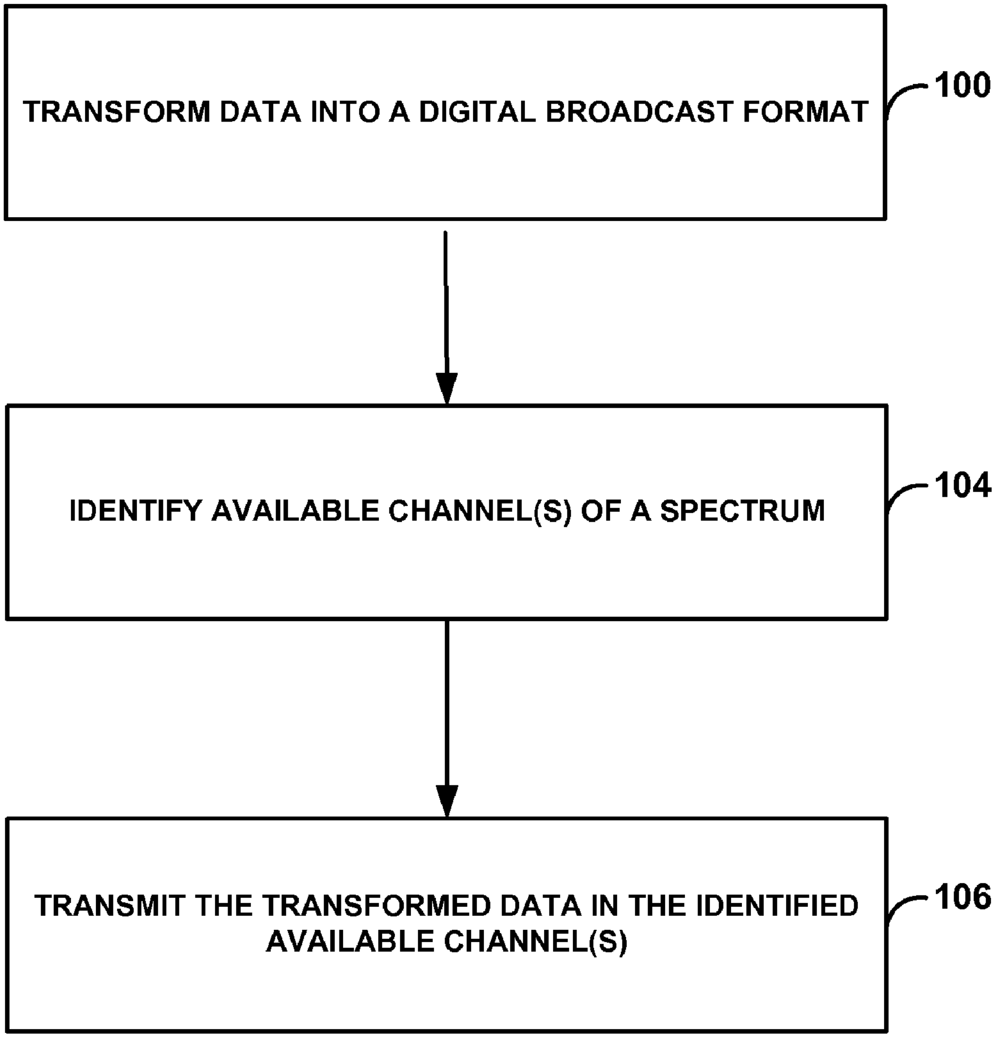
FIG. 8 is a flow diagram illustrating an example of a method that may be performed by a multimedia communication device, such as one or more of the multimedia communication devices shown in FIGS. 1-4, to locally broadcast media data over an identified channel in an unused portion of a digital TV broadcast spectrum.

FIG. 8 is a flow diagram illustrating an example of a method that may be performed by a communication device, such as one or more of the communication devices shown in FIGS. 1-4, to broadcast media data over an identified channel of a spectrum, such as a digital TV broadcast spectrum. For purposes of illustration only in the description below of FIG. 8, it will be assumed that the method of FIG. 8 may be performed by mobile multimedia communication device 30 shown in FIG. 4.

Device 30 may transform data into a digital broadcast format (100) (e.g., using a transformation unit, such as the one included in digital TV transformation unit/transmitter 42 of FIG. 4). The communication device may comprise a multimedia communication device having multimedia capabilities, and the data may comprise multimedia data including at least one of audio data, video data, text data, speech data, and graphics data. In some examples, the digital broadcast format may be an ATSC format, a T-DMB (Terrestrial Digital Multimedia Broadcasting) format, or a DVB (Digital Video Broadcasting) format, though various other digital formats may also be utilized. Device 30 may use one or more video and/or audio encoders (e.g., video/audio encoders 50A shown in FIG. 5 or video/audio encoders 50B shown in FIG. 6) and/or multiplexers, along with one or more modulators/duplexers/switches, when transforming the multimedia data. Transforming the multimedia data may include encoding the multimedia data to comply with the digital broadcast format, and modulating the encoded multimedia data.

If the multimedia data comprises video or graphics data, device 30 may display the video or graphics data on a display, such as on embedded display 38 (FIG. 4) or a display external to device 30. If the multimedia data comprises audio data, device 30 may provide the audio data to one or more speakers, such as to embedded speakers 40 (FIG. 4) or speakers that are external to device 30.

Device 30 may identify at least one available channel of a spectrum (104) (e.g., using a channel identifier, such as channel identifier 44 of FIG. 4). Such identification may, in some cases, be initiated by the device. For example, device 30 may use a spectrum sensor (e.g., spectrum sensor 70A of FIG. 5 or spectrum sensor 70B of FIG. 6) and/or information accessed from a digital TV bands database (e.g., digital TV bands database 74 of FIG. 5) to identify the at least one available channel. In some cases, device 30 may identify the at least one available channel in an unused portion of a broadcast spectrum, such as a broadcast television spectrum. In some cases, the at least one available channel may comprise television band white space. The digital broadcast format may comprise an ATSC (Advanced Television Systems Committee) format, a T-DMB (Terrestrial Digital Multimedia Broadcasting) format, a DVB (Digital Video Broadcasting) format, or a Moving Picture Experts Group Transport Stream (MPEG-TS) format, to name only a few non-limiting examples.

In some examples, device 30 may utilize a channel identifier to identify at least one other available channel for subsequent transmission and/or broadcasting of data if the at least one available channel becomes occupied (e.g., by a licensed user). In some cases, device 30 may use a channel identifier to periodically determine whether the at least one available channel is still available or has become occupied over a period of time. Device 30 may use a spectrum sensor and/or access a geo-location database, in some cases, when making such a determination.

In one example, device 30 may include a geo-location sensor (e.g., geo-location sensor 73 of FIG. 5) to determine geographic coordinates of device 30. Device 30 may then provide the geographic coordinates as input to the digital TV bands database.

When device 30 utilizes a spectrum sensor, device 30 may assign one or more quality values associated with one or more channels that are sensed by the spectrum sensor. The quality values may be based on noise levels, interference (e.g., from extraneous signals or unauthorized/unlicensed users), or other factors. For example, device 30 may utilize the spectrum sensor to obtain certain quality values for each individually sensed channel within a defined frequency range or band, such as interference levels or signal-to-noise ratios that may be associated with the channels. Device 30 may utilize the meta information provided by these quality values to assess the quality of each channel (e.g., low quality, medium quality, high quality). For example, if the quality values for an available channel indicate that the channel would have a high signal-to-noise ratio with a low amount of interference, device 30 may determine that the channel may be a high-quality channel. On the other hand, if the quality values for the available channel indicate that the channel would have a low signal-to-noise ratio or have a high amount of interference, device 30 may determine than the channel may be a low-quality channel.

Device 30 may correlate the one or more quality values with available channel information provided by the digital TV bands database in order to identify the at least one available channel, such as is shown in the example of FIG. 9. For instance, in one scenario, the correlating may include determining that a channel is available when the channel information provided by the digital TV bands database indicates that the channel is available and when one of the quality values associated with the channel exceeds a certain quality threshold.

After device 30 has identified at least one available channel, device 30 may transmit (e.g., via transmitter 59A of FIG. 5 or transmitter 59B of FIG. 6) the transformed data (e.g., to one or more separate, external devices) in the at least one identified available channel (106). For example, device 30 may initiate a broadcast transmission to one or more external multimedia output devices, such as television devices, upon request of device 30. In one example, device 30 may comprise a master device (e.g., master device 82 of FIG. 7). In this example, device 30 may send information identifying the at least one available channel to one or more separate client devices (e.g., client devices 88 and/or 94 of FIG. 7).

FIG. 9 is a flow diagram illustrating an example of a method that may be performed by a multimedia communication device, such as one or more of the multimedia communication devices shown in FIGS. 1-4, to identify an available channel. In some cases, the device may identify an available channel using a spectrum sensor and information received from a digital TV bands (geo-location) database. In some cases, the device may identify an available channel using only a spectrum sensor. For purposes of illustration only in the description below of FIG. 9, it will be assumed that the method shown in FIG. 9 is performed by mobile multimedia communication device 30 shown in FIG. 4.

In some cases, mobile multimedia communication device 30 may receive channel information for a particular channel from a geo-location database (120), such as digital TV bands (geo-location) database 74 shown in the example of FIG. 5. The channel may comprise a channel in a frequency band of broadcast spectrum for a digital TV format, such as ATSC. Mobile multimedia communication device 30 may utilize a geo-location sensor (e.g., geo-location sensor 73 of FIG. 5) provide geo-location information for device 30, as input, to the geo-location database, such that the geo-location database provides channel information for the channel back to device 30 based upon the location of device 30. In some embodiments, however, such as shown in the example of FIG. 6, when a geo-location database is not used or accessed, device 30 may not receive any channel information from a geo-location database.

Device 30 may further receive signal information for the same channel from a spectrum sensor (122), such as from spectrum sensor 70A shown in FIG. 5. In this example, device 30 receives channel information for the channel from both a geo-location database and a spectrum sensor.

In those cases in which device 30 communicates with a geo-location database, device 30 may first determine whether the channel information provided by the geo-location database indicates that the channel is unavailable (126). For example, the geo-location database may indicate that the channel is currently being used by another authorized service provider or user. In this case, device 30 may determine to look for and use another channel that is available for broadcast transmissions (124), regardless of whether the spectrum sensor indicates that the channel is available or not.

If, however, the geo-location database indicates that the channel is available, device 30 may then determine whether the channel information provided by the spectrum sensor indicates that the channel may be occupied or have a low quality level (128). In some cases, the geo-location database may not be completed up-to-date, in which case the channel may be occupied even if the geo-location database indicates otherwise. If the spectrum sensor indicates that the channel may be occupied, device 30 may determine to ignore the channel and look for another channel that is available (124).

If the spectrum sensor identifies an available channel but indicates, or determines from meta information, that the channel may be available but would have a low quality level (e.g., high noise level, high amount of interference) based upon one or more determine quality values, device 30 may determine to ignore the channel and look for another available channel (124) for broadcast transmissions. The quality values may be based on noise levels, interference (e.g., from extraneous signals or unauthorized/unlicensed users), or other factors. The quality values may be based upon one or more metrics, such as a signal-to-noise ratio, a signal-to-interference ratio, a measured noise floor, or other metrics. (In those cases when device 30 communicates with a geo-location database, device 30 may again receive channel information from the geo-location database when looking for another available channel. In other cases, device 30 may only receive channel information from the spectrum sensor to look for another available channel.)

If, however, the spectrum sensor indicates that the channel may be available and also has a moderate-to-high quality level, as indicated by the quality values, device 30 may then select the channel for broadcast transmission of multimedia data (130). In certain cases, when the device 30 determines that the channel may have only a moderate quality level (e.g., based upon the processed quality values), device 30 may select the channel for use, but may increase the transmit power for broadcast communications that use the channel due to the moderate (rather than high) quality level of the channel.

In some examples, device 30 may rely only on the information provided by the geo-location database regarding the availability of one or more channels. In these examples, even if device 30 includes a spectrum sensor, device 30 may disable the spectrum sensor or ignore the channel information provided by the sensor, and select an available channel based only upon the information provided by the geo-location database.

In some examples, a communication device, such as device 30, may perform the method shown in FIG. 9 multiple times during the execution of one or more services or applications to identify multiple available channels that may be used for broadcast of multimedia data. For instance, a particular application may have high bandwidth requirements, and may require the use of multiple transmission channels. Device 30 may perform the method shown in FIG. 9 one or more times to identify multiple available transmission channels that may be used by the application to broadcast multimedia data to an external device, such as a television.

The techniques described in this disclosure may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware, or any combination thereof. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices, and may be used in any of a variety of image, display, audio, or other multi-multimedia applications and devices. In some aspects, for example, such components may form part of a mobile device, such as a wireless communication device handset (e.g., a mobile telephone handset).

If implemented in software, the techniques may be realized at least in part by a computer-readable data storage medium comprising code with instructions that, when executed by one or more processors, performs one or more of the methods described above. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various aspects have been described in this disclosure. These and other aspects are within the scope of the following claims.

The invention claimed is:

1. A method for transmitting data, comprising:
- transforming data into a digital broadcast format;
- identifying at least one available channel of a spectrum;
- transmitting the transformed data in the at least one identified available channel;
- wherein identifying the at least one available channel comprises using a spectrum sensor to identify the at least one available channel;
- wherein identifying the at least one available channel further comprises accessing a digital television (TV) bands database to identify the at least one available channel; and
- further comprising determining geographic coordinates of a communication device, and wherein accessing the digital TV bands database comprises providing the geographic coordinates as input to the digital TV bands database.

2. The method of claim 1, wherein identifying the at least one available channel comprises identifying the at least one available channel in an unused portion of a broadcast television spectrum.

3. The method of claim 1, wherein identifying the at least one available channel comprises identifying television band white space.

4. The method of claim 1, wherein the digital broadcast format comprises an ATSC (Advanced Television Systems Committee) format, a T-DMB (Terrestrial Digital Multimedia Broadcasting) format, a DVB (Digital Video Broadcasting) format, an Integrated Services Digital Broadcasting Terrestrial (ISDB-T) format, or a Moving Picture Experts Group Transport Stream (MPEG-TS) format.

5. The method of claim 1, wherein identifying the at least one available channel is initiated by a communication device.

6. The method of claim 5, wherein:
- the communication device comprises a multimedia communication device having multimedia capabilities; and
- the data comprises multimedia data including at least one of audio data, video data, text data, speech data, and graphics data.

7. The method of claim 6, wherein:
- transforming the multimedia data comprises encoding the multimedia data to comply with the digital broadcast format, and modulating the encoded multimedia data; and
- transmitting the transformed data comprises transmitting the transformed data in the at least one identified available channel from the multimedia communication device to one or more external devices.

8. The method of claim 6, wherein when the multimedia data comprises video or graphics data, the method further comprises displaying the video or graphics data on a display of the multimedia communication device.

9. The method of claim 6, wherein when the multimedia data comprises audio data, the method further comprises providing the audio data to one or more speakers.

10. The method of claim 1, wherein identifying the at least one available channel comprises using a spectrum sensor to identify the at least one available channel.

11. The method of claim 1, further comprising assigning one or more quality values associated with one or more channels that are sensed by the spectrum sensor.

12. The method of claim 11, wherein identifying the at least one available channel comprises correlating the one or more quality values with available channel information provided by the digital TV bands database in order to identify the at least one available channel.

13. The method of claim 12, wherein correlating comprises determining that a channel is available when the channel information provided by the digital TV bands database indicates that the channel is available and when one of the quality values associated with the channel exceeds a quality threshold.

14. The method of claim 1, further comprising identifying at least one other available channel if the at least one available channel becomes occupied by another user.

15. The method of claim 14, further comprising periodically determining whether the at least one available channel is still available or has become occupied by another user.

16. A computer-readable storage medium comprising instructions for causing one or more processors to:
- transform data into a digital broadcast format;
- identify at least one available channel of a spectrum; and
- transmit the transformed data in the at least one identified available channel;
- wherein the instructions to identify the at least one available channel comprise instructions to use a spectrum sensor to identify the at least one available channel;
- wherein the instructions to identify the at least one available channel further comprise instructions to access a digital television (TV) bands database to identify the at least one available channel;
- further comprising instructions to determine geographic coordinates of a communication device, and wherein the instructions to access the digital TV bands database comprise instructions to provide the geographic coordinates as input to the digital TV bands database.

17. The computer-readable storage medium of claim 16, wherein the instructions to identify the at least one available channel comprise instructions to identify the at least one available channel in an unused portion of a broadcast television spectrum.

18. The computer-readable storage medium of claim 16, wherein the instructions to identify the at least one available channel comprise instructions to identify television band white space.

19. The computer-readable storage medium of claim 16, wherein the identification of the at least one available channel is initiated by a communication device.

20. The computer-readable storage medium of claim 16, wherein the instructions to identify the at least one available channel comprise instructions to use a spectrum sensor to identify the at least one available channel.

21. The computer-readable storage medium of claim 16, further comprising instruction to identify at least one other available channel if the at least one available channel becomes occupied by another user.

22. The computer-readable storage medium of claim 21, further comprising instructions to periodically determine whether the at least one available channel is still available or has become occupied by another user.

23. A communication device, comprising:

a transformation unit configured to transform data into a digital broadcast format;

a channel identifier configured to identify at least one available channel of a spectrum; and a digital transmitter configured to transmit the transformed data in the at least one identified available channel;

further comprising a spectrum sensor, wherein the channel identifier is configured to use the spectrum sensor to identify the at least one available channel;

wherein the channel identifier is configured to identify the at least one available channel at least by accessing a digital television (TV) bands database to identify the at least one available channel;

further comprising a geo-location sensor configured to determine geographic coordinates of the communication device, and wherein the channel identifier is configured to access the digital TV bands database at least by providing the geographic coordinates as input to the digital TV bands database.

24. The communication device of claim 23, wherein the channel identifier is configured to identify the at least one available channel in an unused portion of a broadcast television spectrum.

25. The communication device of claim 23, wherein the channel identifier is configured to identify the at least one available channel by identifying television band white space.

26. The communication device of claim 23, wherein the digital broadcast format comprises an ATSC (Advanced Television Systems Committee) format, a T-DMB (Terrestrial Digital Multimedia Broadcasting) format, a DVB (Digital Video Broadcasting) format, an Integrated Services Digital Broadcasting Terrestrial (ISDB-T) format, or a Moving Picture Experts Group Transport Stream (MPEG-TS) format.

27. The communication device of claim 23, wherein the channel identifier is configured to identify the at least one available channel upon initiation by the communication device.

28. The communication device of claim 23, wherein:

the communication device comprises a multimedia communication device having multimedia capabilities; and the data comprises multimedia data including at least one of audio data, video data, text data, speech data, and graphics data.

29. The communication device of claim 28, wherein:

the transformation unit comprises a digital multimedia encoder configured to encode the multimedia data to comply with the digital broadcast format, and the transformation unit further comprising a digital multimedia modulator configured to modulate the encoded multimedia data; and the digital transmitter is configured to transmit the transformed data at least by transmitting the transformed data in the at least one identified available channel from the multimedia communication device to one or more external devices.

30. The communication device of claim 28, wherein when the multimedia data comprises video or graphics data, the multimedia communication device further comprises a display device to display the video or graphics data.

31. The communication device of claim 28, wherein when the multimedia data comprises audio data, the multimedia communication device further comprises one or more speakers to output the audio data.

32. The communication device of claim 23, further comprising a spectrum sensor, wherein the channel identifier is configured to use the spectrum sensor to identify the at least one available channel.

33. The communication device of claim 23, wherein the channel identifier is further configured to assign one or more quality values associated with one or more channels that are sensed by the spectrum sensor.

34. The communication device of claim 33, wherein the channel identifier is configured to correlate the one or more quality values with available channel information provided by the digital TV bands database in order to identify the at least one available channel.

35. The communication device of claim 34, wherein the channel identifier is configured to determine that a channel is available when the channel information provided by the digital TV bands database indicates that the channel is available and when one of the quality values associated with the channel exceeds a quality threshold.

36. The communication device of claim 23, wherein the channel identifier is further configured to identify at least one other available channel if the at least one available channel becomes occupied by another user.

37. The communication device of claim 36, wherein the channel identifier is further configured to periodically determine whether the at least one available channel is still available or has become occupied by another user.

38. The communication device of claim 23, wherein the communication device comprises a master device, and wherein the digital transmitter is further configured to send information identifying the at least one available channel to a device other than the master device.

39. The communication device of claim 23, wherein the communication device comprises a wireless communication device handset.

40. The communication device of claim 23, wherein the communication device comprises one or more integrated circuit devices.

41. A communication device, comprising:

means for transforming data into a digital broadcast format;

means for identifying at least one available channel of a spectrum; and means for transmitting the transformed data in the at least one identified available channel;

wherein the means for identifying the at least one available channel comprises means for using a spectrum sensor to identify the at least one available channel;

wherein the means for identifying the at least one available channel further comprises means for accessing a digital television (TV) bands database to identify the at least one available channel;

further comprising means for determining geographic coordinates of the multimedia communication device, and wherein the means for accessing the digital TV bands database comprises means for providing the geographic coordinates as input to the digital TV bands database.

42. The communication device of claim 41, wherein the means for identifying the at least one available channel comprises means for identifying the at least one available channel in an unused portion of a broadcast television spectrum.

43. The communication device of claim 41, wherein the means for identifying the at least one available channel comprises means for identifying television band white space.

44. The communication device of claim 41, wherein the means for identifying the at least one available channel comprises means for identifying the at least one available channel upon initiation by the communication device.

45. The communication device of claim 41, wherein the means for identifying the at least one available channel comprises means for using a spectrum sensor to identify the at least one available channel.

46. The communication device of claim 41, further comprising means for identifying at least one other available channel if the at least one available channel becomes occupied by another user.

47. The communication device of claim 46, further comprising means for periodically determining whether the at least one available channel is still available or has become occupied by another user.

* * * * *